(12) United States Patent
Chen et al.

(10) Patent No.: US 7,873,080 B2
(45) Date of Patent: Jan. 18, 2011

(54) WAVELENGTH OR PULSEWIDTH TUNABLE MODE-LOCKED FIBER LASER SYSTEM

(75) Inventors: Nan-Kuang Chen, Miaoli (TW); Jim-Wein Lin, Miaoli (TW); Yinchieh Lai, Hsinchu (TW); Sien Chi, Hsinchu (TW); Jing-Shyang Horng, Miaoli (TW); Chien-Yuan Han, Miaoli (TW); Hsi-Wen Yang, Miaoli (TW)

(73) Assignee: National United University, Miaoli (TW)

( * ) Notice: Subject to any disclaimer, the term of this patent is extended or adjusted under 35 U.S.C. 154(b) by 54 days.

(21) Appl. No.: 12/493,914

(22) Filed: Jun. 29, 2009

(65) Prior Publication Data
US 2010/0215062 A1   Aug. 26, 2010

(30) Foreign Application Priority Data
Feb. 23, 2009   (TW) ............................... 98105712 A

(51) Int. Cl.
*H01S 3/098* (2006.01)
(52) U.S. Cl. .......................................... 372/18; 372/20
(58) Field of Classification Search ................... 372/6, 372/20, 18, 22
See application file for complete search history.

(56) References Cited
U.S. PATENT DOCUMENTS

| | | | | |
|---|---|---|---|---|
| 5,828,680 A | * | 10/1998 | Kim et al. ...................... | 372/18 |
| 5,911,015 A | * | 6/1999 | Bigo .............................. | 385/1 |
| 6,185,230 B1 | * | 2/2001 | Waarts .......................... | 372/6 |
| 6,313,941 B1 | * | 11/2001 | Suzuki et al. ................ | 359/337 |
| 6,845,108 B1 | * | 1/2005 | Liu et al. ...................... | 372/20 |

* cited by examiner

*Primary Examiner*—Minsun Harvey
*Assistant Examiner*—Tuan N. Nguyen
(74) *Attorney, Agent, or Firm*—Volpe and Koenig, P.C.

(57) ABSTRACT

A wavelength-tunable mode-locked fiber laser system is provided and includes an optical cavity. The optical cavity outputs an output laser pulse having an adjustable principal wavelength, and includes a short-wavelength-pass filter, a polarization controller, an optical gain fiber and a fiber. The short-wavelength-pass filter produces an intracavity laser pulse. The fiber has a length, and connects the short-wavelength-pass filter, the polarization controller and the optical gain fiber in series. The optical cavity has an anomalous dispersion range and a net group-velocity dispersion being within the anomalous dispersion range due to the length of the fiber. The optical cavity causes the intracavity laser pulse to propagate therein for providing the output laser pulse, providing a first laser pulse, a second laser pulse and a third laser pulse to the short-wavelength-pass filter, the polarization controller and the optical gain fiber respectively, and adjusting the intracavity laser pulse.

12 Claims, 4 Drawing Sheets

WAVELENGTH OR PULSEWIDTH TUNABLE MODE-LOCKED FIBER LASER SYSTEM

FIELD OF THE INVENTION

The present invention relates to a mode-locked fiber laser system, and more particularly to a wavelength or pulsewidth tunable mode-locked fiber laser system using a short-wavelength-pass filter.

BACKGROUND OF THE INVENTION

The invention and the application of the laser are considered to be the most important achievement of science in the twentieth century. Today, the goods related to the laser technology around the modern life have had too many things for the eye to see for a long time. The high-energy laser, e.g. the pulse laser, is widely used in the cutting of the industry or the surgical operation, which sufficiently affirms the value of the laser technology.

A fiber ring cavity is a conventional device used for producing an output laser pulse PW1. Please refer to FIG. 1, which is a schematic diagram showing a conventional configuration of a fiber ring cavity. As shown, a ring cavity 10 includes a wavelength division multiplexing device 11, a fiber 12, an optical gain fiber 13, a polarization controller 14 and an optical coupler 15. The wavelength division multiplexing device 11 is coupled to the fiber 12, and couples a pump light beam PB1 into the ring cavity 10. The optical gain fiber 13 includes an optical gain dope, e.g. a rare earth element substance, a transition metal element substance or a nonlinear effect substance. The pump light beam PB1 goes into the optical gain fiber 13 along the clockwise direction and excites ground-state electrons of the optical gain dope in the optical gain fiber 13 to positions of the excited state, so that photons having different wavelengths are released. These photons travel along the fiber 12 within the ring cavity 10 to form light beams having different wavelengths.

With the progress of time, the pump light beam PB1 is continuously coupled into the ring cavity 10 through the wavelength division multiplexing device 11 and causes the optical gain fiber 13 continuously releases light beams having different wavelengths. However, only some light beams can develop into the standing-wave state and continuously exist in the ring cavity 10, and the other light beams gradually decay to finally disappear, wherein an integer multiple of the half wavelength of each of the some light beams is just equal to the total length of the ring cavity 10. As the arrows, marked in the inner side of the ring cavity 10, show in FIG. 1, a light beam goes forward along the counterclockwise direction to form a standing wave. The polarization controller 14 adjusts the polarization of the light beam passing through the polarization controller 14 and causes the light beam to form laser light beams, which are in a co-polarization state. The laser light beams interfere mutually so as to form a laser pulse PC1 output by the polarization controller 14, i.e. the polarization controller 14 is used for mode-locking the laser pulse PC1. The ring cavity 10 causes the laser pulse PC1 to propagate within the ring cavity 10 for providing a laser pulse PD1, a laser pulse PU1 and a laser pulse PH1 to the optical gain fiber 13, the optical coupler 15 and the polarization controller PH1 respectively.

The laser pulse PD1 propagates into the optical gain fiber 13 to further induce photons out so as to make an optical gain, which causes the intensity of the laser pulse PD1 to continuously increase for forming an amplified laser pulse, wherein the photons are homologous with the intracavity laser pulse PC1. In the meantime, the amplified laser pulse propagates along the counterclockwise direction in the ring cavity 10. When the laser pulse PH1 passes through the optical coupler 15, a small portion 10-20% of the laser pulse PH1 is output by the optical coupler 15 to be the output laser pulse PW1 as shown in FIG. 1.

It is often necessary for the practical application of the laser pulse to handle two important parameters, the wavelength and the time pulse width. To adjust the wavelength of the laser pulse is necessary for fitting the processed material property. It is also necessary for different applications to be able to control the time pulse width of the laser pulse. Although it seems that the abovementioned configuration of the ring cavity 10 is simple, it is difficult to effectively control the wavelength and the time pulse width, so that further improvement is required.

SUMMARY OF THE INVENTION

It is an object of the present invention to provide a mode-locked fiber laser. According to the experiment data, when a short-wavelength-pass filter is disposed in an optical cavity, the short-wavelength-pass filter can be used to adjust each of the allowably existed bandwidth of the optical gain and the net group-velocity dispersion of the laser cavity so as to form a wavelength or pulsewidth tunable mode-locked fiber laser.

It is therefore an aspect of the present invention to provide a wavelength-tunable mode-locked fiber laser system including an optical cavity. The optical cavity introduces a pump light beam therein, outputs an output laser pulse having an adjustable principal wavelength, and includes a short-wavelength-pass filter, a polarization controller, an optical gain fiber and a fiber. The short-wavelength-pass filter produces an intracavity laser pulse. The fiber has a length, and connects the short-wavelength-pass filter, the polarization controller and the optical gain fiber in series. The optical cavity has an anomalous dispersion range and a net group-velocity dispersion being within the anomalous dispersion range due to the length of the fiber. The optical cavity causes the intracavity laser pulse to propagate therein for providing the output laser pulse and providing a first laser pulse, a second laser pulse and a third laser pulse to the short-wavelength-pass filter, the polarization controller and the optical gain fiber respectively. The short-wavelength-pass filter has a cutoff wavelength and filters out any light of the first laser pulse having a wavelength longer than the cutoff wavelength for adjusting the intracavity laser pulse. The polarization controller adjusts the second laser pulse to a co-polarization state for producing a fourth laser pulse. The optical gain fiber uses the pump light beam for amplifying the third laser pulse.

Preferably, the optical gain fiber includes an optical gain dope.

Preferably, the pump light beam is a laser beam.

Preferably, the optical gain dope includes at least one selected from a group consisting of a rare earth element substance, a transition metal element substance and a nonlinear effect substance.

Preferably, the optical cavity is a ring cavity and further includes a wavelength division multiplexing device and an optical coupler. The wavelength division multiplexing device couples the pump light beam into the ring cavity. The optical coupler is coupled to the fiber and outputting the output laser pulse.

Preferably, the optical cavity is a linear cavity and further includes a first optical reflection component and a second optical reflection component. The intracavity laser pulse propagates for further providing a fifth and a sixth laser pulses to the first and the second optical reflection components respectively. The first optical reflection component reflects any light of the fifth laser pulse in the linear cavity having a propagating direction opposite to that of the pump light beam, and transmits the pump light beam into the linear cavity. The second optical reflection component partially reflects any light of the sixth laser pulse in the linear cavity having a propagating direction the same with that of the pump light beam, and outputs the output laser pulse.

Preferably, the adjustable principal wavelength of the output laser pulse is adjusted based on at least an adjusting parameter of the short-wavelength-pass filter being one selected from a group consisting of a temperature, a magnetic field, an electrical field and an acoustic wave.

Preferably, the short-wavelength-pass filter is a fiber-type tunable filter, and the adjustable principal wavelength of the output laser pulse is adjusted based on an adjusting parameter being a temperature.

It is therefore another aspect of the present invention to provide a pulsewidth-tunable mode-locked fiber laser system including an optical cavity. The optical cavity introduces a pump light beam therein, outputs an output laser pulse having a stretchable pulse width, and includes a short-wavelength-pass filter, a polarization controller, an optical gain fiber and a fiber. The short-wavelength-pass filter produces an intracavity laser pulse. The fiber has a length, and connects the short-wavelength-pass filter, the polarization controller and the optical gain fiber in series. The optical cavity has a net group-velocity dispersion being close to zero due to the length of the fiber. The optical cavity causes the intracavity laser pulse to propagate therein for providing the output laser pulse and providing a first laser pulse, a second laser pulse and a third laser pulse to the short-wavelength-pass filter, the polarization controller and the optical gain fiber respectively. The short-wavelength-pass filter has a cutoff wavelength and filters out any light of the first laser pulse having a wavelength longer than the cutoff wavelength for adjusting the intracavity laser pulse. The polarization controller adjusts the second laser pulse to a co-polarization state for producing a fourth laser pulse. The optical gain fiber uses the pump light beam for amplifying the third laser pulse.

Preferably, the optical gain fiber includes an optical gain dope.

Preferably, the pump light beam is a laser beam.

Preferably, the optical gain dope includes at least one selected from a group consisting of a rare earth element substance, a transition metal element substance and a nonlinear effect substance.

Preferably, the optical cavity is a ring cavity and further includes a wavelength division multiplexing device and an optical coupler. The wavelength division multiplexing device couples the pump light beam into the ring cavity. The optical coupler is coupled to the fiber and outputting the output laser pulse.

Preferably, the optical cavity is a linear cavity and further includes a first optical reflection component and a second optical reflection component. The intracavity laser pulse propagates for further providing a fifth and a sixth laser pulses to the first and the second optical reflection components respectively. The first optical reflection component reflects any light of the fifth laser pulse in the linear cavity having a propagating direction opposite to that of the pump light beam, and transmits the pump light beam into the linear cavity. The second optical reflection component partially reflects any light of the sixth laser pulse in the linear cavity having a propagating direction the same with that of the pump light beam, and outputs the output laser pulse.

Preferably, the stretchable pulse width of the output laser pulse is adjusted based on at least an adjusting parameter of the short-wavelength-pass filter being one selected from a group consisting of a temperature, a magnetic field, an electrical field and an acoustic wave.

Preferably, the short-wavelength-pass filter is a fiber-type tunable filter, and the stretchable pulse width of the output laser pulse is adjusted based on an adjusting parameter being a temperature.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
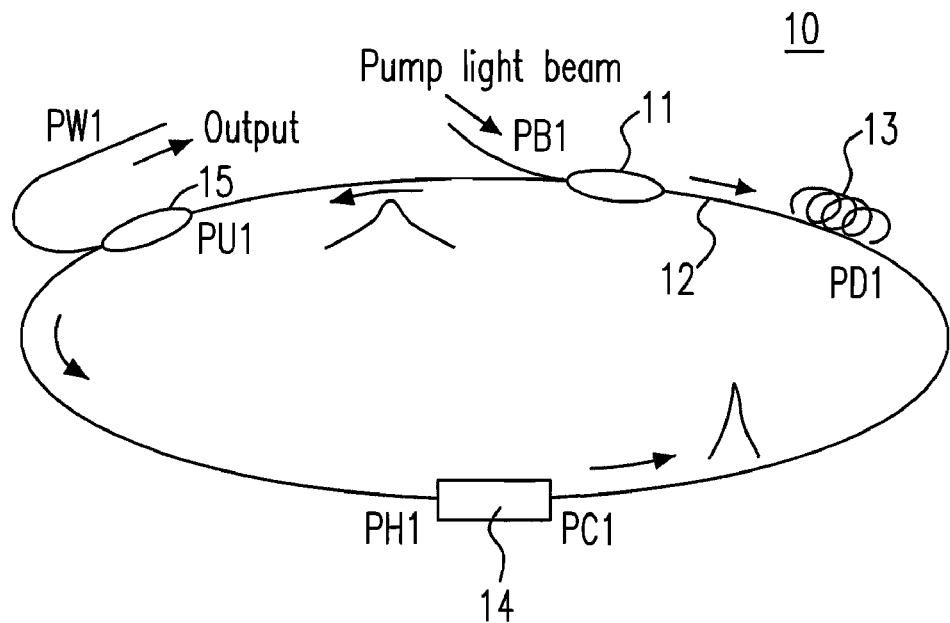
FIG. 1 is a schematic diagram showing a conventional configuration of a fiber ring cavity in the prior art.
Figure 2:
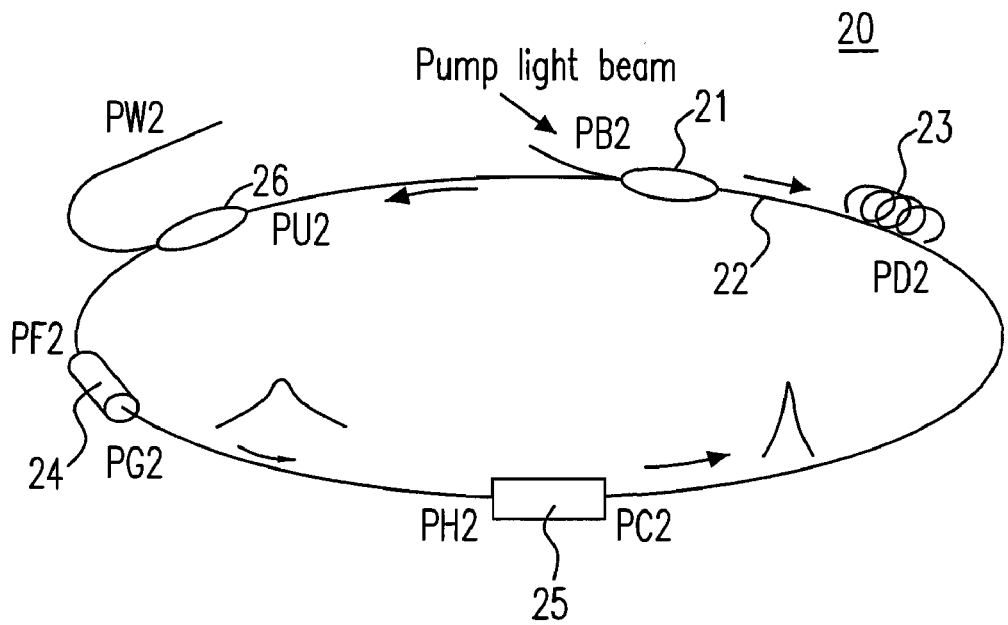
FIG. 2 is a schematic diagram showing a ring-cavity configuration of a wavelength or pulsewidth tunable mode-locked fiber laser system using a short-wavelength-pass filter according to the present invention.

Please refer to FIG. 2, which is a schematic diagram showing a ring-cavity configuration of a wavelength or pulsewidth tunable mode-locked fiber laser system using a short-wavelength-pass filter according to the present invention. As shown in FIG. 2, a ring cavity 20 includes a wavelength division multiplexing device 21, a fiber 22, an optical gain fiber 23, a short-wavelength-pass filter 24, a polarization controller 25 and an optical coupler 26. Very clearly, the configurations of both the ring cavity 20 shown in FIG. 2 and the ring cavity 10 shown in FIG. 1 are basically similar. Therefore, the process that the ring cavity 20 produces an output laser pulse PW2 is described as the aforementioned, and is supplemented as follows.

The ring cavity 20 introduces a pump light beam PB2 therein and outputs the output laser pulse PW2. The short-wavelength-pass filter 24 produces an intracavity laser pulse PG2. The fiber 22 has a length and connects the wavelength division multiplexing device 21, the optical coupler 26, the short-wavelength-pass filter 24, the polarization controller 25 and the optical gain fiber 23 in series. The optical cavity 20 has an anomalous dispersion range and a net group-velocity dispersion for lights, propagating in the linear cavity 50.

The optical cavity 20 causes the intracavity laser pulse PG2 to propagate within the ring cavity 20 for providing the output laser pulse PW2 and providing a laser pulse PD2, a laser pulse PU2, a laser pulse PF2 and a laser pulse PH2 to the optical gain fiber 23, the optical coupler 26, the short-wavelength-pass filter 24 and the polarization controller 25 respectively. The polarization controller 25 adjusts the laser pulse PH2 to a co-polarization state for producing a laser pulse PC2. The optical gain fiber 23 uses the pump light beam PB2 for amplifying the laser pulse PD2.

The short-wavelength-pass filter 24 has a cutoff wavelength. A function of the short-wavelength-pass filter 24 is to filter out any light of the laser pulse PF2 having a wavelength longer than the cutoff wavelength, i.e. only the laser light having shorter wavelengths can continuously exist in the ring cavity 20, for adjusting the intracavity laser pulse PG2. The output laser pulse PW2 may be adjusted through the adjustment of the intracavity laser pulse PG2. Besides, the short-wavelength-pass filter 24 may further have a function controlling or adjusting the dispersion of the ring cavity 20. Thus, the ring cavity 20 forms a mode-locked fiber laser system. In general, the short-wavelength-pass filter 24 has an adjusting parameter, which is a physical property such as a temperature, a magnetic field, an electrical field or an acoustic wave, and utilizes the adjusting parameter to adjusting the intracavity laser pulse PG2, so that the output laser pulse PW2 is adjusted. In this embodiment, the short-wavelength-pass filter 24 is a fiber-type tunable filter, which has an adjusting parameter being a temperature.

When the total lengths of the ring cavity 20 are different, the net group-velocity dispersions of the ring cavity 20 are also different. The length of the fiber 22 is determined, which causes the net group-velocity dispersion of the ring cavity 20 to be within the anomalous dispersion range of the optical cavity 20. The optical coupler 26 outputs the output laser pulse PW2. The adjusting parameter of the short-wavelength-pass filter 24 is controlled, so that the time pulse width of the output laser pulse PW2 is unchangeable and the principal wavelength of the output laser pulse PW2 can be adjusted. Giving a practical example, the length of the ring cavity 20 is about 12.8 m, and the optical gain fiber 23 is an erbium-doped fiber having a length of about 3.5 m.

Figure 3A:
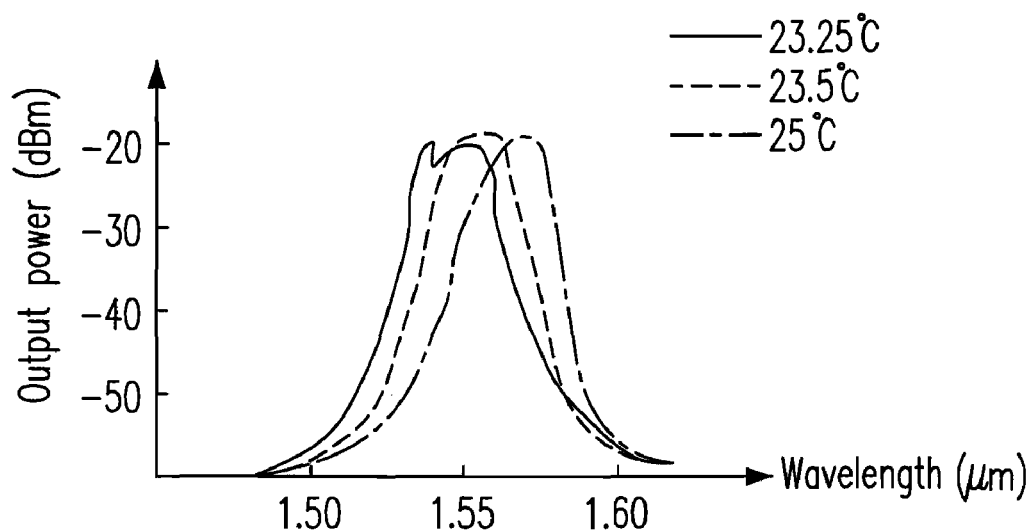
FIG. 3(a) is a schematic diagram showing wavelength experiment data of the wavelength tunable mode-locked fiber laser system according to the present invention.
Figure 3B:
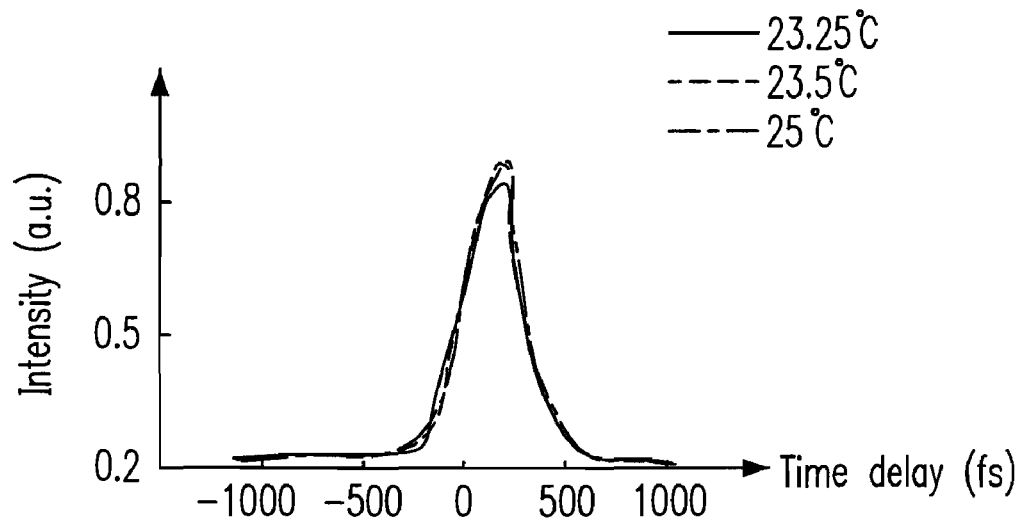
FIG. 3(b) is a schematic diagram showing pulsewidth experiment data of the wavelength tunable mode-locked fiber laser system according to the present invention.

FIG. 3(a) is a schematic diagram showing a change of output power obtained from the output laser pulse PW2 of the ring cavity 20 according to a change of the wavelength. FIG. 3(a) is drafted under the conditions that the ring cavity 20 receives the pump light beam PB2 being a laser beam having a wavelength of about 980 nm. As shown in FIG. 3(a), there are three curves of output power distributions corresponding to three different temperatures respectively. When the temperature rises from 23.25° C. to 25° C., the principal wavelength of the output laser pulse PW2 moves from the position slightly less than 1.55 μm to the position between 1.55-1.60 μm, i.e. the principal wavelength thereof is adjustable. FIG. 3(b) is a schematic diagram showing a change of intensity obtained from the output laser pulse PW2 of the ring cavity 20 according to a change of the time delay. As shown in FIG. 3(b), there are three curves of intensity distributions corresponding to the three different temperatures respectively. When the temperature rises from 23.25° C. to 25° C., the time pulse width of the output laser pulse PW2 almost does not change.

Figure 4:
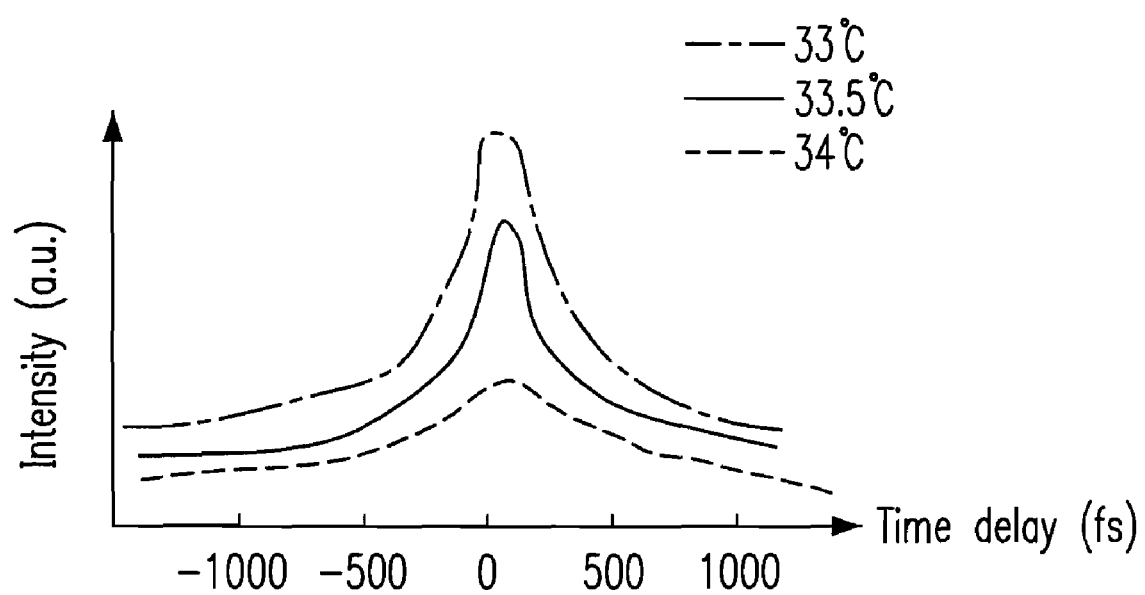
FIG. 4 is a schematic diagram showing experiment data of the pulsewidth tunable mode-locked fiber laser system according to the present invention.

The scheme of another application is described as follows. The length of the fiber 22 is determined, which causes the net group-velocity dispersion of the ring cavity 20 to be close to zero. The optical coupler 26 outputs the output laser pulse PW2. The adjusting parameter of the short-wavelength-pass filter 24 is controlled, so that the principal wavelength of the output laser pulse PW2 is unchangeable and the time pulse width thereof can be stretched. Giving a practical example, the preferable length of the ring cavity 20 is about 10.2 m, and the optical gain fiber 23 is an erbium-doped fiber having a length of about 3.5 m. FIG. 4 is a schematic diagram showing a change of intensity obtained from the output laser pulse PW2 of the ring cavity 20 according to a change of the time delay. FIG. 4 is drafted under the conditions that the ring cavity 20 receives the pump light beam PB2 being a laser beam having a wavelength of about 980 nm. As shown in FIG. 4, there are three curves of intensity distributions corresponding to three different temperatures respectively. When the temperature rises from 33° C. to 34° C., the time pulse width of the output laser pulse PW2 clearly becomes wider and the intensity distribution of the output laser pulse PW2 becomes flatter across the time delay, i.e. the pulse width thereof is stretchable.

The abovementioned is summarized as follows. The mode-locked fiber laser system provided in the present invention is based on the same configuration of the ring cavity 20, and is configured to adjust the length of the ring cavity 20 (e.g. adjusting the length of the fiber 22) to cause the net group-velocity dispersions of the ring cavity 20 to be at different values so as to produce different applications. When the net group-velocity dispersion is within the anomalous dispersion range of the ring cavity 20, the mode-locked fiber laser system is configured to be able to adjust the principal wavelength of the output laser pulse PW2. When the net group-velocity dispersion is close to zero, the mode-locked fiber laser system is configured to be able to stretch the time pulse width of the output laser pulse PW2. Therefore, the issue, either the wavelength or the time pulse width of the output laser pulse is difficult to handle, can be solved through the mode-locked fiber laser system provided in the present invention.

Figure 5:
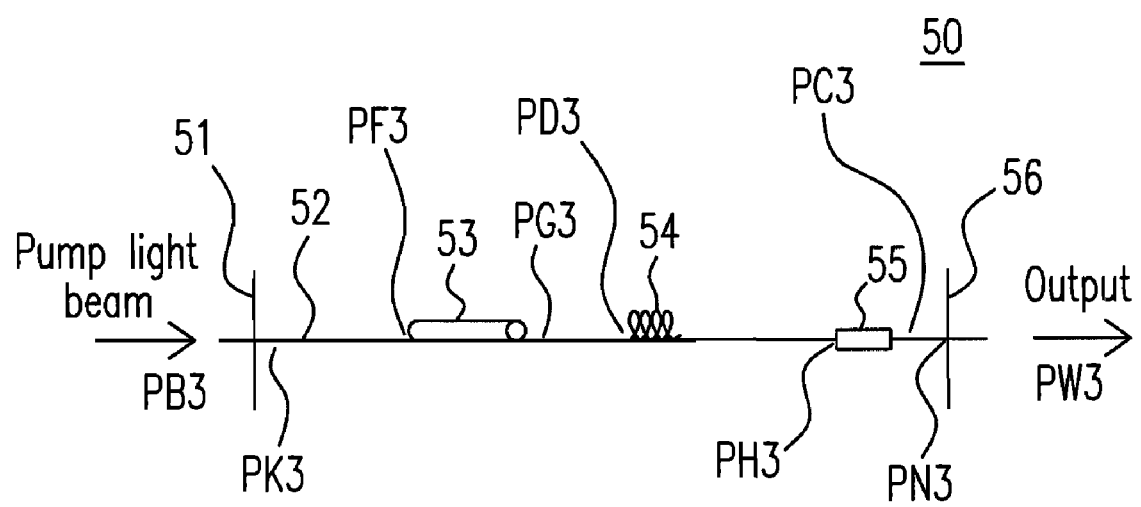
FIG. 5 is a schematic diagram showing a linear-cavity configuration of a wavelength or pulsewidth tunable mode-locked fiber laser system using a short-wavelength-pass filter according to the present invention.

Except the ring cavity 20, the configuration of the optical cavity can also be a linear cavity. Please refer to FIG. 5, which is a schematic diagram showing a linear-cavity configuration of a wavelength or pulsewidth tunable mode-locked fiber laser system using a short-wavelength-pass filter according to the present invention. As shown in FIG. 5, the linear cavity 50 includes a first optical reflection component 51, a fiber 52, a short-wavelength-pass filter 53, an optical gain fiber 54, a polarization controller 55 and a second optical reflection component 56. The fiber 52 connects the first optical reflection component 51, the short-wavelength-pass filter 53, the optical gain fiber 54, the polarization controller 55 and the second optical reflection component 56 in series. A pump light beam PB3 passes the first optical reflection component 51 into the linear cavity 50, goes along the fiber 52 to excite electrons, located in the 4f layer of the erbium ion doped in the optical gain fiber 54, to positions of the excited state, so that photons having different wavelengths are released. Preferably, it is designed that the first optical reflection component 51 is a grating having a reflection rate of 100% and the second optical reflection component 56 is a grating having a reflection rate of 80%.

These photons travel in the fiber 52, and the first optical reflection component 51 and the second optical reflection component 56 can reflect these photons. These photons go back and forth in the linear cavity 50 to form light beams having different wavelengths. When the length of the linear cavity 50 is equal to an integer multiple of the half wavelength of each of some beams, these beams can produce resonance and the linear cavity 50 accumulates the energy through these beams. Contrasting with the embodiment shown in FIG. 2, the process, the linear cavity 50 produces the output laser pulse PW3, is similar to the aforementioned, and is supplemented as follows.

The linear cavity 50 introduces a pump light beam PB3 therein and outputs the output laser pulse PW3. The short-wavelength-pass filter 53 produces an intracavity laser pulse PG3. The linear cavity 50 causes the intracavity laser pulse PG3 to propagate within the linear cavity 50 for providing the output laser pulse PW3 and providing plural laser pulses PK3, PN3, PF3, PD3 and PH3 to the first optical reflection component 51, the second optical reflection component 56, the short-wavelength-pass filter 53, the optical gain fiber 54 and the polarization controller 55 respectively. The first optical reflection component 51 reflects any light of the laser pulse PK3 in the linear cavity 50 having a propagating direction opposite to that of the pump light beam PB3, and transmits the pump light beam PB3 into the linear cavity 50. The second optical reflection component 56 partially reflects any light of the laser pulse PN3 in the linear cavity 50 having a propagating direction the same with that of the pump light beam PB3, and outputs the output laser pulse PW3. Because the second optical reflection component 56 is a grating having a reflection rate of 80%, a small portion of the laser pulse PN3 is output to be the output laser pulse PW3. The short-wavelength-pass filter 53 may be used for adjusting the intracavity laser pulse PG3 and the output laser pulse PW3, and the polarization controller 55 is used for producing a laser pulse PC3.

Similarly, the linear cavity 50 has an anomalous dispersion range and a net group-velocity dispersion for lights, propagating in the linear cavity 50. When the lengths of the linear cavity 50 are different, the net group-velocity dispersions of the linear cavity 50 are also different. The length of the fiber 52 is determined, which causes the net group-velocity dispersion of the linear cavity 50 to be within the anomalous dispersion range of the linear cavity 50. The adjusting parameter of the short-wavelength-pass filter 53 is controlled, so that the time pulse width of the output laser pulse PW3 is unchangeable and the principal wavelength of the output laser pulse PW3 can be adjusted. The scheme of another application is described as follows. The length of the fiber 52 is determined, which causes the net group-velocity dispersion of the linear cavity 50 to be close to zero. The adjusting parameter of the short-wavelength-pass filter 53 is controlled, so that the principal wavelength of the output laser pulse PW3 is unchangeable and the time pulse width of the output laser pulse PW3 can be stretched.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A wavelength-tunable mode-locked fiber laser system, comprising: an optical cavity introducing a pump light beam therein, outputting an output laser pulse having an adjustable principal wavelength, and comprising: a short-wavelength-pass filter producing an intracavity laser pulse; a polarization controller; an optical gain fiber; and a fiber having a length, and connecting the short-wavelength-pass filter, the polarization controller and the optical gain fiber in series, wherein: the optical cavity has an anomalous dispersion range and a net group-velocity dispersion being within the anomalous dispersion range due to the length of the fiber; the optical cavity causes the intracavity laser pulse to propagate therein for providing the output laser pulse and providing a first laser pulse, a second laser pulse and a third laser pulse to the short-wavelength-pass filter, the polarization controller and the optical gain fiber respectively; the short-wavelength-pass filter has a cutoff wavelength and filters out any light of the first laser pulse having a wavelength longer than the cutoff wavelength for adjusting the intracavity laser pulse; the polarization controller adjusts the second laser pulse to a co-polarization state for producing a fourth laser pulse; and the optical gain fiber uses the pump light beam for amplifying the third laser pulse; wherein: the optical cavity is a linear cavity; and the optical cavity further comprises: a first optical reflection component; and a second optical reflection component, wherein: the intracavity laser pulse propagates for further providing a fifth and a sixth laser pulses to the first and the second optical reflection components respectively; the first optical reflection component reflects any light of the fifth laser pulse in the linear cavity having a propagating direction opposite to that of the pump light beam, and transmits the pump light beam into the linear cavity; and the second optical reflection component partially reflects any light of the sixth laser pulse in the linear cavity having a propagating direction the same with that of the pump light beam, and outputs the output laser pulse.

2. A wavelength-tunable mode-locked fiber laser system according to claim 1, wherein:
the optical gain fiber comprises an optical gain dope including at least one selected from a group consisting of a rare earth element substance, a transition metal element substance and a nonlinear effect substance; and
the pump light beam is a laser beam.

3. A wavelength-tunable mode-locked fiber laser system according to claim 1, the adjustable principal wavelength of the output laser pulse is adjusted based on at least an adjusting parameter of the short-wavelength-pass filter being one selected from a group consisting of a temperature, a magnetic field, an electrical field and an acoustic wave.

4. A wavelength-tunable mode-locked fiber laser system according to claim 1, wherein the short-wavelength-pass filter is a fiber-type tunable filter.

5. A wavelength-tunable mode-locked fiber laser system according to claim 4, the adjustable principal wavelength of the output laser pulse is adjusted based on an adjusting parameter being a temperature.

6. A wavelength-tunable mode-locked fiber laser system according to claim 5, wherein the adjusting parameter is applied to the fiber-type tunable filter.

7. A pulsewidth-tunable mode-locked fiber laser system, comprising: an optical cavity introducing a pump light beam therein, outputting an output laser pulse having a stretchable pulse width, and comprising: a short-wavelength-pass filter producing an intracavity laser pulse; a polarization controller; an optical gain fiber; and a fiber having a length, and connecting the short-wavelength-pass filter, the polarization controller and the optical gain fiber in series, wherein: the optical cavity has a net group-velocity dispersion being close to zero due to the length of the fiber; the optical cavity causes the intracavity laser pulse to propagate therein for providing the output laser pulse and providing a first laser pulse, a second laser pulse and a third laser pulse to the short-wavelength-pass filter, the polarization controller and the optical gain fiber respectively; the short-wavelength-pass filter has a cutoff wavelength and filters out any light of the first laser pulse having a wavelength longer than the cutoff wavelength for adjusting the intracavity laser pulse; the polarization controller adjusts the second laser pulse to a co-polarization state for producing a fourth laser pulse; and the optical gain fiber uses the pump light beam for amplifying the third laser pulse; wherein: the optical cavity is a linear cavity; and the optical cavity further comprises: a first optical reflection component; and a second optical reflection component, wherein: the intracavity laser pulse propagates for further providing a fifth and a sixth laser pulses to the first and the second optical reflection components respectively; the first optical reflection component reflects any light of the fifth laser pulse in the linear cavity having a propagating direction opposite to that of the pump light beam, and transmits the pump light beam into the linear cavity; and the second optical reflection component partially reflects any light of the sixth laser pulse in the linear cavity having a propagating direction the same with that of the pump light beam, and outputs the output laser pulse.

8. A pulsewidth-tunable mode-locked fiber laser system according to claim 7, wherein:

the optical gain fiber comprises an optical gain dope including at least one selected from a group consisting of a rare earth element substance, a transition metal element substance and a nonlinear effect substance; and the pump light beam is a laser beam.

9. A pulsewidth-tunable mode-locked fiber laser system according to claim 7, the stretchable pulse width of the output laser pulse is adjusted based on at least an adjusting parameter of the short-wavelength-pass filter being one selected from a group consisting of a temperature, a magnetic field, an electrical field and an acoustic wave.

10. A pulsewidth-tunable mode-locked fiber laser system according to claim 7, wherein the short-wavelength-pass filter is a fiber-type tunable filter.

11. A pulsewidth-tunable mode-locked fiber laser system according to claim 10, the stretchable pulse width of the output laser pulse is adjusted based on an adjusting parameter being a temperature.

12. A pulsewidth-tunable mode-locked fiber laser system according to claim 11, wherein the adjusting parameter is applied to the fiber-type tunable filter.

* * * * *